United States Patent
Adler et al.

(10) Patent No.: US 8,291,786 B2
(45) Date of Patent: Oct. 23, 2012

(54) BALL NUT

(75) Inventors: Dieter Adler, Herzogenaurach (DE);
Markus Stiegler, Eltersdorf (DE);
Markus Oswald, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 328 days.

(21) Appl. No.: 12/752,298

(22) Filed: Apr. 1, 2010

(65) Prior Publication Data

US 2010/0251845 A1    Oct. 7, 2010

(30) Foreign Application Priority Data

Apr. 3, 2009   (DE) .................. 10 2009 016 199

(51) Int. Cl.
*F16H 1/18* (2006.01)
(52) U.S. Cl. .................. 74/424.86; 74/424.87; 74/89.25
(58) Field of Classification Search .................. 74/89.23, 74/89.25, 424.81, 424.82, 424.86, 424.7
See application file for complete search history.

(56) References Cited

U.S. PATENT DOCUMENTS

| | | | | | |
|---|---|---|---|---|---|
| 5,485,760 | A | * | 1/1996 | Lange | 74/89.25 |
| 5,974,908 | A | * | 11/1999 | Shirai et al. | 74/424.87 |
| 6,237,434 | B1 | * | 5/2001 | Brown et al. | 74/424.82 |
| 2008/0092680 | A1 | * | 4/2008 | Kim et al. | 74/89.31 |
| 2008/0257080 | A1 | * | 10/2008 | Singh | 74/89.23 |
| 2011/0167940 | A1 | * | 7/2011 | Shavrnoch et al. | 74/89.36 |

* cited by examiner

*Primary Examiner* — David M Fenstermacher
(74) *Attorney, Agent, or Firm* — Lucas & Mercanti, LLP; Klaus P. Stoffel

(57) ABSTRACT

A ball nut of a ball screw drive, in which the ball nut is mounted on a threaded spindle via balls. The ball nut has on its inner circumference a ball groove wound helically around an axis that extends over at least one winding, and a deflection body, with deflection ends, arranged on a circumferential face of the ball nut. The deflection ends engage into a recess of the ball nut, and adjoin an end and a start of the ball groove. The deflection body is supported on one side in radial directions and on the other side on a machine part. The deflection body is connected at its axial ends to bearings for mounting on the machine part. The bearings, which project circumferentially, engage into the recesses of the ball nut and are arranged with their bearing faces approximately flush with the outer circumferential face of the ball nut.

7 Claims, 2 Drawing Sheets

BALL NUT

This application claims the priority of DE 10 2009 016 199.6 filed Apr. 3, 2009, which is incorporated by reference herein.

FIELD OF THE INVENTION

The present invention relates to a ball nut of a ball screw drive. Ball screw drives are used, in order to convert a rotating movement of the ball nut or the threaded spindle into a linear movement of the threaded spindle or the ball nut.

BACKGROUND OF THE INVENTION

DE 10 2004 055 423 A1 has disclosed, for example, a ball screw drive, in which the ball nut is mounted on the threaded spindle via balls. A ball groove for the balls is provided on the inner circumference of the ball nut, which ball groove is wound helically around the ball-nut axis and extends over a plurality of windings. A deflection body is arranged on the circumferential face of the ball nut, the deflection ends of which deflection body engage in each case into a recess of the ball nut. One deflection end adjoins a start of the ball groove and the other deflection end adjoins an end of the ball groove in order to delimit an endless ball channel. The deflection body has a deflection section, in order to deflect the balls from a start to an end of a loadbearing section which is delimited by the ball groove. In the radial directions, the deflection body is supported on one side on the circumferential face of the ball nut and on the other side on a machine part which is configured in the present case as a pulley and is arranged on the ball nut. The pulley is provided on a front side with a segment-shaped recess, into which the deflection body engages. Integrally formed spring elements which is supported on the radially outer wall of the segment-shaped recess are formed on the outer circumference of the deflection body. The spring elements which are arranged spaced apart from one another circumferentially form bearing faces, in order to support the deflection body properly radially to the outside.

The pulley is provided with a central hub opening, the segment-shaped recess which is described being formed between the wall of the hub opening and the outer circumference of the pulley. The segment-shaped recess which is required for proper mounting of the deflection body is associated with a considerable production outlay. In particular, if the deflection body extends over a plurality of windings of the ball groove, it can be very complex to configure a segment-shaped recess of corresponding design on the pulley.

Furthermore, these bearing faces which are configured as spring elements form exposed points which can be easily damaged during transport of the ball nut without the machine part. Even during the assembly of the machine part, undesired catching can occur between the machine part and the spring elements of the deflection body, with the result that damage cannot be ruled out.

OBJECT OF THE INVENTION

It was therefore an object of the present invention to specify a ball nut according to the features of the preamble of Claim 1, in which ball nut the mounting of the deflection body on the machine part is of simplified and installation-friendly configuration.

SUMMARY OF THE INVENTION

According to the invention, this object is achieved by the ball nut according to Claim 1. Damage to the bearing points as a result of transport of the ball nut is ruled out by virtue of the fact that the deflection body is connected integrally at its axial ends to the bearings for radial mounting on the machine part, and as a result of the fact that the bearings which project circumferentially engage into the recesses of the ball nut and terminate with their bearing faces approximately flush with the outer circumferential face of the ball nut. Assembly of the machine part on the ball nut is also simplified because the bearing faces which are arranged flush in a way according to the invention cannot catch with the machine part in an undesirable way.

The arrangement of the bearings which terminates approximately flush with the circumferential face also comprises arrangements, in which the bearing faces are arranged at a small radial spacing from the circumferential face of the ball nut, for example from $1/10$ to $2/10$ mm. Accordingly, the bearing faces can protrude somewhat, or else also be arranged radially within the circumferential face. If the mounting on the machine part is to take place under radial prestress, it may be expedient if the bearing faces protrude in an elevated manner from the circumferential face of the ball nut. If thermal expansions of the deflection body which is preferably produced from plastic are to be compensated for in the mounting, it may be expedient if the bearing faces are positioned radially within and at a spacing from the circumferential face of the ball nut in the recesses.

The balls circulate in an endless circulating channel which has a loadbearing section and a deflection section. The loadbearing section is delimited by the ball groove which is formed on the inner circumference of the ball nut. The deflection section is formed on the deflection body, the deflection section endlessly connecting a start to an end of the loadbearing section.

A further advantage of the invention can be seen in the fact that noise production of the ball nut is reduced. The balls which circulate in the endless ball channel can cause vibrations in the deflection body as a result of impacts with walls of the endless ball channel, which vibrations are not, however, transmitted as solid-borne sound, since contact of the deflection body with further machine parts is considerably reduced on account of the bearings which are arranged so as to project. Only the bearings can transmit solid-borne sound in contact with the machine part, the projecting bearings with their bearing faces of small surface area counteracting a transmission of solid-borne sound.

Finally, a further advantage of the invention is that the machine part can be of simpler configuration, on which machine part the deflection body is mounted radially. This is because it is sufficient in the ball nut according to the invention, when the machine part has a cylindrical hub opening which is simple to produce in terms of manufacturing technology, the walls of the cylindrical hub opening at the same time forming abutments for the bearing faces of the bearings. An axial groove which is simple to produce on these machine parts is sufficient to receive the deflection body which, however, can remain with its circumferential face preferably spaced apart from the wall of the axial groove.

The deflection body which extends over a plurality of windings of the ball groove is preferably arranged substantially parallel to the ball-nut axis. This arrangement makes a simple configuration possible of a receptacle for the deflection body on the machine part, in particular if the deflection body is of substantially block-shaped configuration.

A simple mounting for the deflection body provides for the bearings to be arranged on ends of the deflection body which lie diagonally opposite one another. This arrangement is also favorable because the ball inlets which are to be provided on the deflection body can be integrated into these bearings. These ball inlets engage into the ball groove of the threaded spindle, in order to lift the balls out of the ball groove of the threaded spindle and into the deflection section of the endless ball channel.

In a ball screw drive which is provided with a ball nut according to the invention, a ball channel for the balls is formed in a known way by ball grooves on the spindle nut and on the threaded spindle. Furthermore, in this ball screw drive, the machine part is configured as a drive wheel, in particular as a pulley, this drive wheel being provided with a concentric hub opening, in which the spindle nut is arranged.

Ball screw drives of this type are suitable in a favorable way for use in an electromechanically assisted steering system, in which a steering actuation is assisted mechanically by the ball screw drive which is driven by electric motor.

In ball screw drives of this type, the wall of the concentric hub opening can favorably be used as an abutment for the bearing faces of the bearings.

BRIEF DESCRIPTION OF THE DRAWING

In the following text, the invention will be explained in greater detail using an exemplary embodiment which is depicted in a total of five figures, in which.

DETAILED DESCRIPTION OF THE DRAWING

Figure 1:
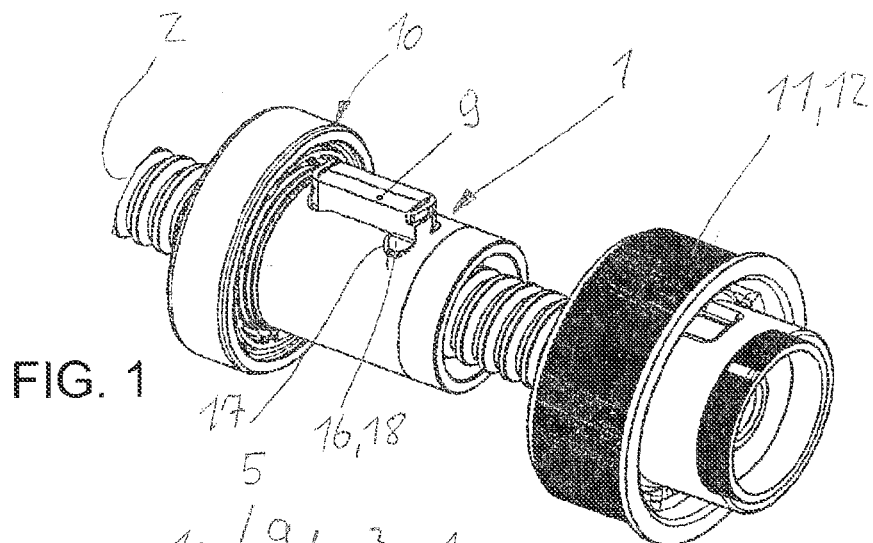
FIG. 1 shows a ball screw drive with a ball nut according to the invention, in a perspective illustration.
Figure 2:
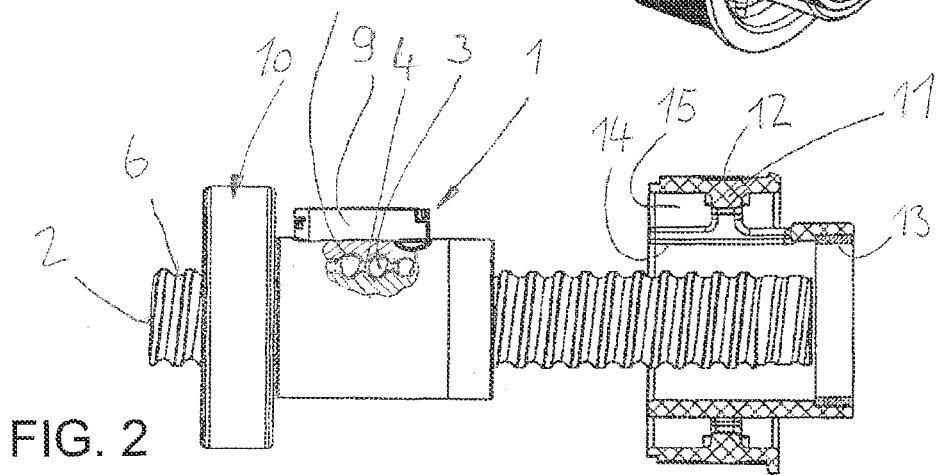
FIG. 2 shows the ball screw drive from FIG. 1 in a partial longitudinal section.
Figure 5:
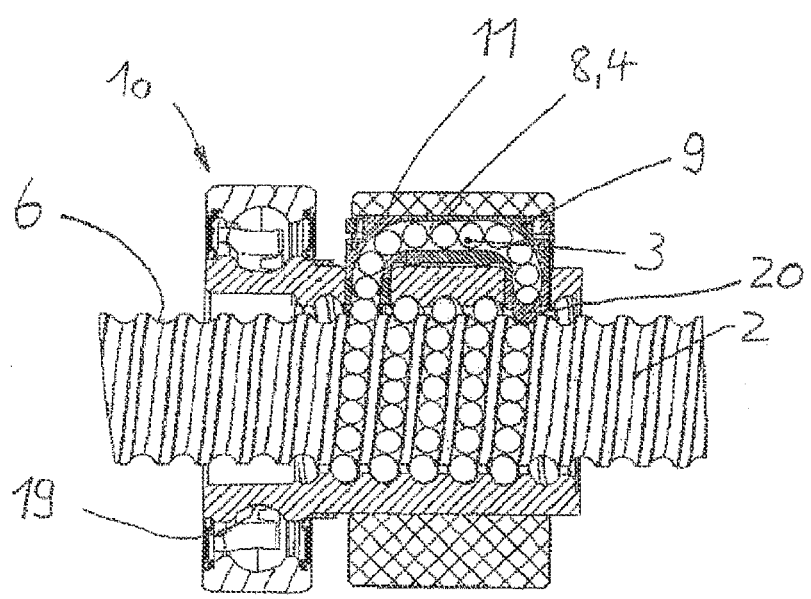
FIG. 5 shows a longitudinal section through the ball screw drive with the ball nut according to the invention.

FIGS. 1, 2 and 5 show a ball screw drive according to the invention in longitudinal section and in a perspective illustration, in which a ball nut 1 is mounted rotatably on a threaded spindle 2 with balls 3 being placed in between. The balls 3 circulate endlessly in an endless ball channel 4.

This endless ball channel 4 has a loadbearing section 7 which is formed by ball grooves 5, 6, the ball grooves 5, 6 being formed on the ball nut 1 and on the threaded spindle 2. These ball grooves 5, 6 wind helically around the longitudinal axis of the threaded spindle 2, said longitudinal axis coinciding with the ball-nut axis of the ball nut 1. In this loadbearing section 7, the balls 3 can roll under load on the ball grooves 5, 6. Furthermore, the endless ball channel 4 has a deflection section 8 (FIG. 5), in which the balls 3 are deflected from a start to an end of the loadbearing section 7 which is formed by the ball grooves 5, 6. The deflection section 8 is formed on a deflection body 9 which is arranged on the circumferential face of the ball nut 1.

The ball nut 1 is mounted via a deep groove ball bearing 10 on a housing (not shown in further detail here).

Furthermore, a pulley 11 is provided which is received fixedly in terms of rotation on the ball nut 1 (FIG. 5), FIGS. 1 and 2 being arranged axially next to the ball nut 1 for reasons of improved clarity. The pulley 11 is provided on its outer circumference with a toothing system 12 for engagement with a toothed belt (not shown here). At its axial end which lies on the right in FIG. 2, the pulley 11 is provided with a bearing ring 13 which can be pressed, for example, onto the circumferential face of the ball nut 1, but at any rate ensures satisfactory mounting of the pulley 11 on the ball nut 1.

Furthermore, the pulley 11 is provided with a hub opening 14 which is arranged concentrically with respect to the threaded spindle 2 and is of cylindrical configuration, with the result that the ball nut 1 can be inserted into this hub opening 14. Furthermore, the pulley 11 is provided with an axial groove 15 which is open on the front side and into which the deflection body 9 engages when the pulley 11 is mounted (FIG. 5).

Figure 3:
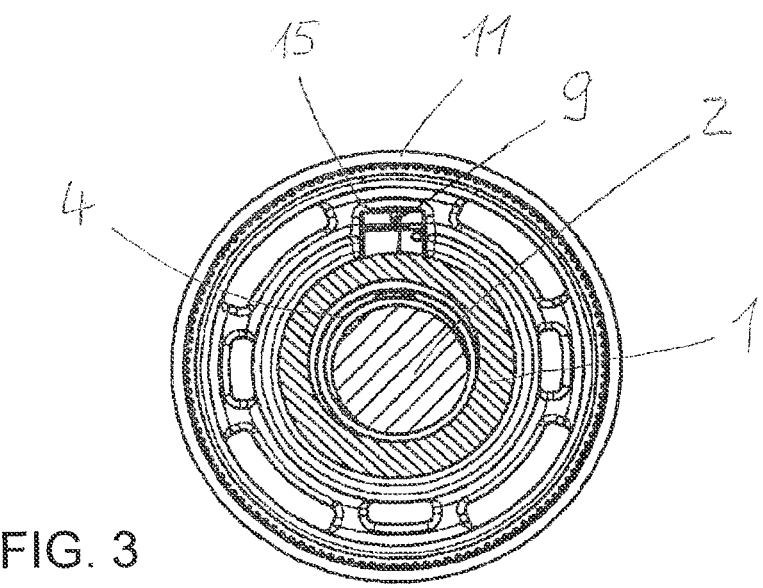
FIG. 3 shows a cross section through the ball screw drive.

FIG. 3 shows the ball screw drive with the pulley 11 which is placed onto the ball nut 1. In order to reduce the transmission of solid-borne sound, it may be expedient if the deflection body is arranged spaced apart from the wall of the axial groove 15.

Furthermore, FIG. 1 shows that the deflection body 9 is arranged parallel to the longitudinal axis of the threaded spindle 2 and extends over a plurality of windings of the ball groove 5, 6. The deflection body 9 is of substantially block-shaped configuration. At its axial ends, the deflection body 9 is provided on diagonally opposite sides with circumferentially projecting bearings 16, of which only one can be seen in FIG. 1. These bearings 16 engage into recesses 17 which are formed on the ball nut 1. The bearings 16 terminate with their circumferentially outer bearing faces 18 flush with the cylindrical circumferential face of the ball nut 1.

When, as depicted in FIG. 5 in longitudinal section, the pulley 11 is mounted on the ball nut 1, the bearings 16 are supported radially to the outside with their bearing faces 18 on the cylindrical wall of the hub opening 14. Accordingly, the cylindrical hub opening 14 serves as an abutment for the bearings 16.

Secondly, the deflection body 9 is supported in a radially inward manner on the cylindrical circumferential face of the ball nut 1. In the circumferential directions, the deflection body 9 is positioned and supported properly by the bearings 16; this is because these bearings 16 are positioned properly by the recesses 17.

Figure 4:
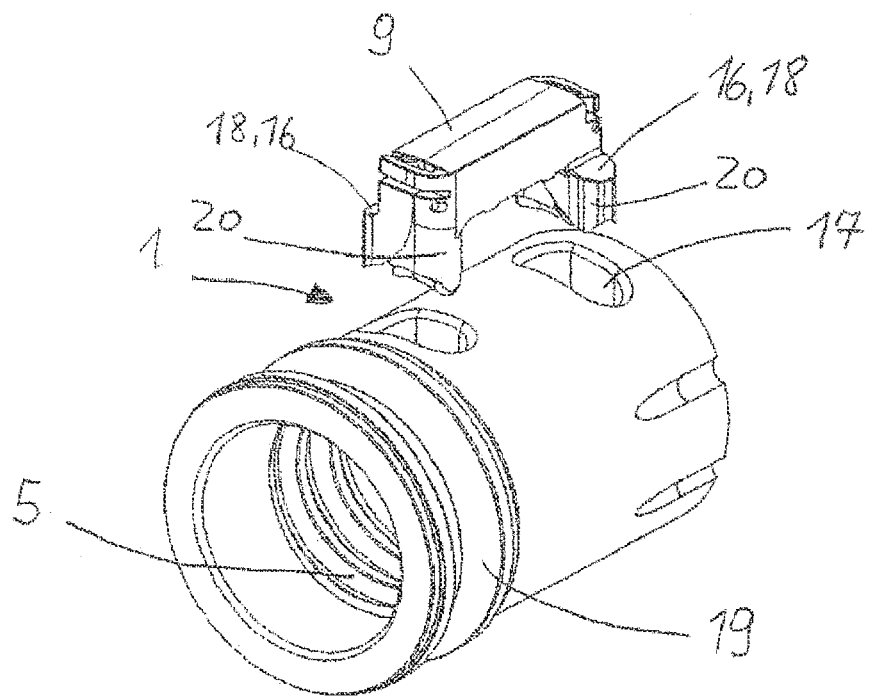
FIG. 4 shows the ball nut according to the invention in a perspective illustration.

FIG. 4 shows the ball nut 1 and the deflection body 9 in a perspective illustration. FIG. 4 clearly shows the recesses 17 in the circumferential face of the ball nut 1 which are provided for the bearings 16. Furthermore, the ball groove 5 which is wound helically around the ball-nut axis on the inner circumference of the ball nut 1 and a ball groove 19 of the deep groove ball bearing 10 mentioned in the introduction, which ball groove 19 is formed on the outer circumference of the ball nut 1, can be seen.

FIGS. 4 and 5 clearly show that ball inlets 20, which are provided on the deflection body 9, engage into the recesses 17 of the ball nut 1. Said ball inlets 20 are provided regularly in ball screw drives with outer deflection. Said ball inlets 20 engage into the ball groove 6 of the threaded spindle 2, in order to lift the balls 3 out of the ball groove 6, with the result that the balls 3 pass into the deflection section 8 of the deflection body 9. At the end of the deflection section 8, the balls 3 finally pass again via the other ball inlet 20 into the ball groove 6 of the threaded spindle 2, with the result that the balls 3 can circulate endlessly in the endless ball channel 4.

The bearings 16 according to the invention on the deflection body 9 are formed integrally with the ball inlets 20. In this way, a mounting for the deflection bodies 9 is provided which is space-saving and which, furthermore, reduces undesired transmission of solid-borne sound to a minimum, since the block-shaped deflection body 9 preferably projects in an elevated manner out of the circumferential face of the ball nut 1 and also does not bear against the pulley 11.

The longitudinal section depicted in FIG. 5 through the ball screw drive shows clearly that the pulley 11 is held at its one axial end on the ball nut 1 via the bearing ring 13.

LIST OF DESIGNATIONS

1 Ball nut
2 Threaded spindle
3 Ball
4 Ball channel
5 Ball groove
6 Ball groove
7 Loadbearing section
8 Deflection section
9 Deflection body
10 Deep groove ball bearing
11 Pulley
12 Toothing system
13 Bearing ring
14 Hub opening
15 Axial groove
16 Bearing
17 Recess
18 Bearing face
19 Ball groove
20 Ball inlet

The invention claimed is:

1. A ball nut of a ball screw drive, in which the ball nut is mounted on a threaded spindle via balls, the ball nut, comprising:
a ball groove with for the balls on an inner circumference, the ball groove being wound helically around a ball-nut axis and extending over at least one winding; and
a deflection body being arranged on a circumferential face of the ball nut, deflection ends of the deflection body engaging, in each case, into a recess of the ball nut and adjoining an end and a start of the ball groove, and the deflection body being supported in radial directions on one side on the circumferential face of the ball nut and on the other side on a machine part which surrounds the ball nut,
wherein the deflection body is connected integrally at axial ends to bearings for radial mounting on the machine part, the bearings, which project circumferentially, engaging into the recesses of the ball nut and being arranged with bearing faces approximately flush with an outer circumferential face of the ball nut.

2. The ball nut of a ball screw drive according to claim 1, wherein the deflection body, which extends over a plurality of windings of the ball groove, is arranged substantially parallel to the ball-nut axis.

3. The ball nut of a ball screw drive according to claim 2, wherein the deflection body is of substantially block-shaped configuration.

4. The ball nut of a ball screw drive according to claim 1, wherein the bearings are arranged on ends of the deflection body which lie diagonally opposite one another.

5. The ball screw drive having the ball nut according to claim 1, wherein the threaded spindle, together with the ball nut, forms an endless ball channel for endless circulation of the balls, and the machine part is configured as a drive wheel, and the drive wheel has a concentric hub opening, in which the spindle nut is arranged.

6. The ball screw drive according to claim 5, wherein the bearings are supported with the bearing faces on a wall of the hub opening.

7. The ball screw drive of claim 5, wherein the drive wheel is a pulley.

* * * * *